June 1, 1954  H. A. BOTTENHORN  2,679,900
SLITTING SHEAR

Filed Oct. 27, 1950  2 Sheets-Sheet 2

INVENTOR.
HERMANN A. BOTTENHORN
BY
Pollard and Johnston
ATTORNEYS

Patented June 1, 1954

2,679,900

UNITED STATES PATENT OFFICE 2,679,900

SLITTING SHEAR

Hermann A. Bottenhorn, Little Neck, N. Y., assignor to Hydropress, Incorporated, New York, N. Y., a corporation of Delaware Application October 27, 1950, Serial No. 192,420

8 Claims. (Cl. 164—60)

The present invention relates to devices for shearing metal sheets or plates, and particularly to rotary shears for slitting metal plates or sheets into several strips.

In the rotary shears heretofore provided for slitting metal plates or sheets, circular cutting blades were attached to a common shaft and positioned axially on the latter by spacing members of fixed dimensions. Such an arrangement may be suitable where the plates or sheets being processed are thin so that the bending forces on the blade supporting shaft are relatively small. However, where thick plates or sheets are to be slit, the shearing forces are excessive and cause bending of the blade shaft so that the widths of the strips between the cutting lines tend to vary. It is not practical to prevent such bending of the blade shaft in the manner that is immediately obvious, that is, by increasing the diameter of the shaft. If the shaft diameter is increased for that purpose, it is then necessary to similarly increase the diameter of the cutting blades to provide sufficient cutting clearance between the cutting edges thereof and the surface of their supporting shaft. Increasing the diameters of the cutting blades disadvantageously increases the initial cost of the machine and also the cost of replacing the cutting blades as they become excessively worn. Furthermore, with cutting blades having larger diameters, a greater torsion must be applied to the shafts supporting the blades in order to provide the requisite shearing forces at the cutting edges and hence a larger driving motor may be required. Even if the undesirable bending of the supporting shafts is overcome, the devices previously proposed are incapable of cutting strips of any desired width, unless a supply of spacing members of a full range of possible lengths are available, and even then changing the spacing between any two of the cutting blades may require the removal of all of the other blades and spacing members from the supporting shaft so that the spacing member between the blades being adjusted can be replaced.

An object of the present invention is to provide a rotary shear for slitting metal plates or sheets into strips which is constructed and arranged so that the shafts supporting the cutting blades are not subjected to severe bending stresses, and so that the blades are capable of individual stepless displacement in a horizontal direction for cutting strips of any desired widths.

Another object resides in the provision of a rotary shear of the character indicated wherein the upper cutting blades are movable vertically as a unit with respect to the related lower cutting blades so that the upper blades and lower blades may be displaced horizontally relative to each other to conveniently utilize the cutting edges at either of the sides of the blades in the shearing operation.

A further object of the invention is to provide a rotary shear of the character indicated which is relatively simple in construction, and is formed to reduce the time and expense of maintenance and of assembly for operation, as well as the cost of replacing parts thereof.

According to the present invention, the above objects are accomplished by providing a rotary shearing device including a frame formed by a lower base and an upper beam which is vertically movable relative to the base, guides formed along the confronting faces of the base and beam, lower main carriages and upper main carriages displaceable horizontally along the guides of said base and beam, respectively, auxiliary carriages displaceable horizontally within said main carriers, a hollow shaft rotatable in each main carriage to support a cutting blade and a hollow shaft rotatable in each auxiliary carriage and slidable on and keyed to the related first mentioned shaft to support a cutting blade, and driving shafts extending slidably through, and keyed to, the hollow main carriage shafts to effect rotation of the cutting blades.

The above objects and other objects, features and advantages of the present invention will be manifest in the following detailed description of a preferred embodiment thereof and in the accompanying illustrative drawings forming a part hereof, and wherein:

Figs. 3, 4 and 5 are diagrammatic illustrations of various arrangements of the cutting blades made possible by the device of Fig. 1.

Figure 1:
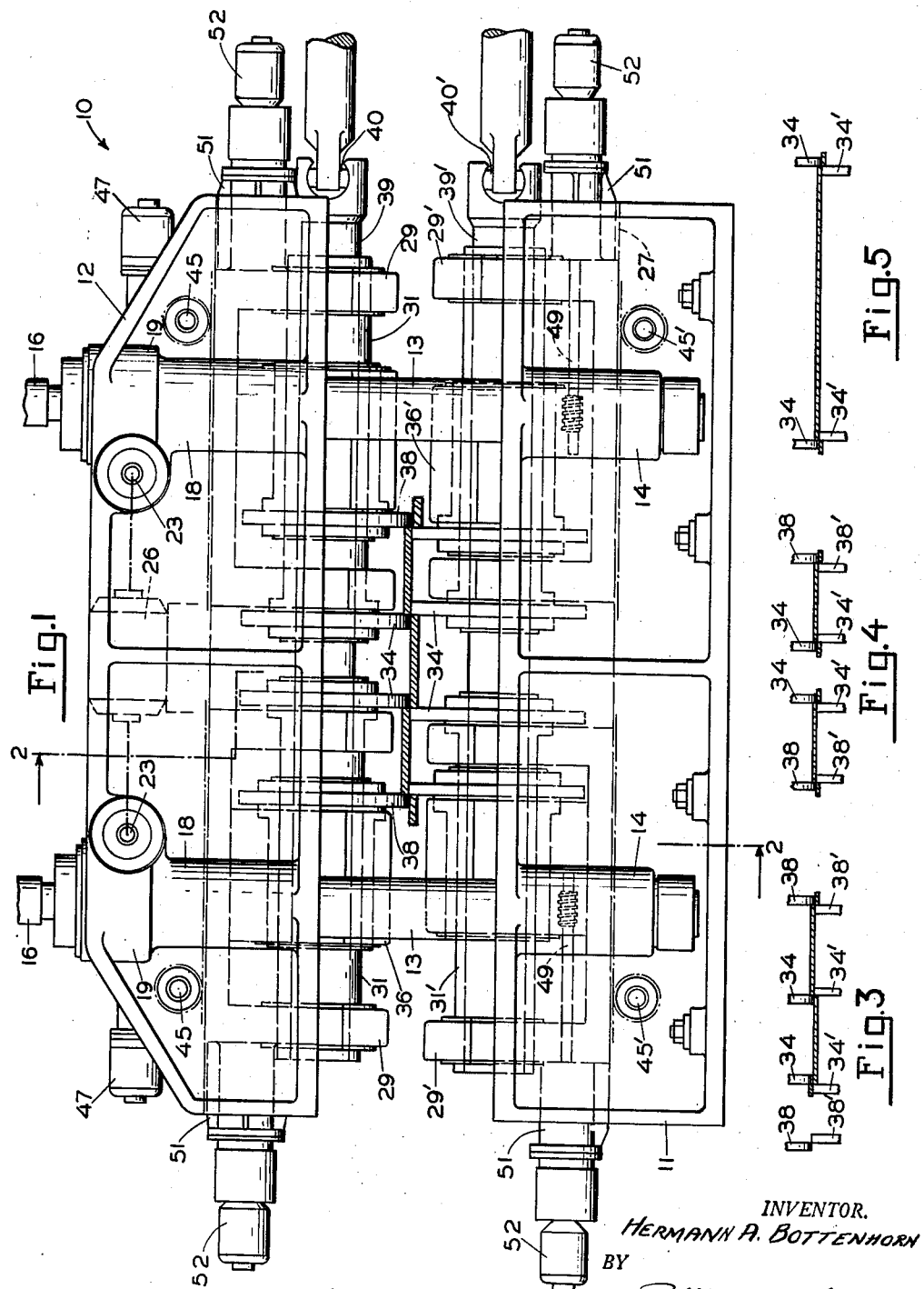
Fig. 1 is a front elevational view of a rotary shear for slitting metal plates or sheets into strips constructed according to an embodiment of the present invention.
Figure 2:
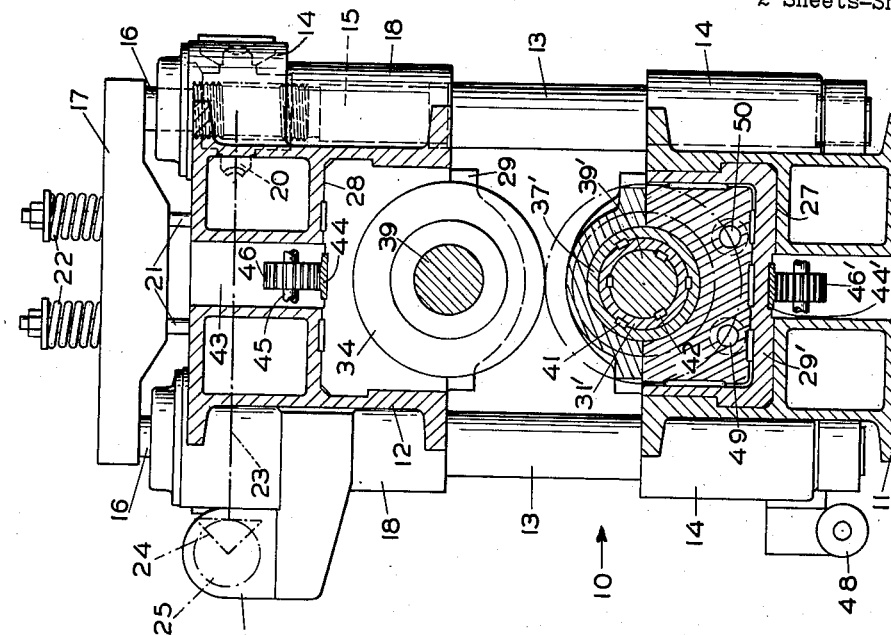
Fig. 2 is a vertical sectional view taken along the line 2—2 of Fig. 1.
Figure 6:
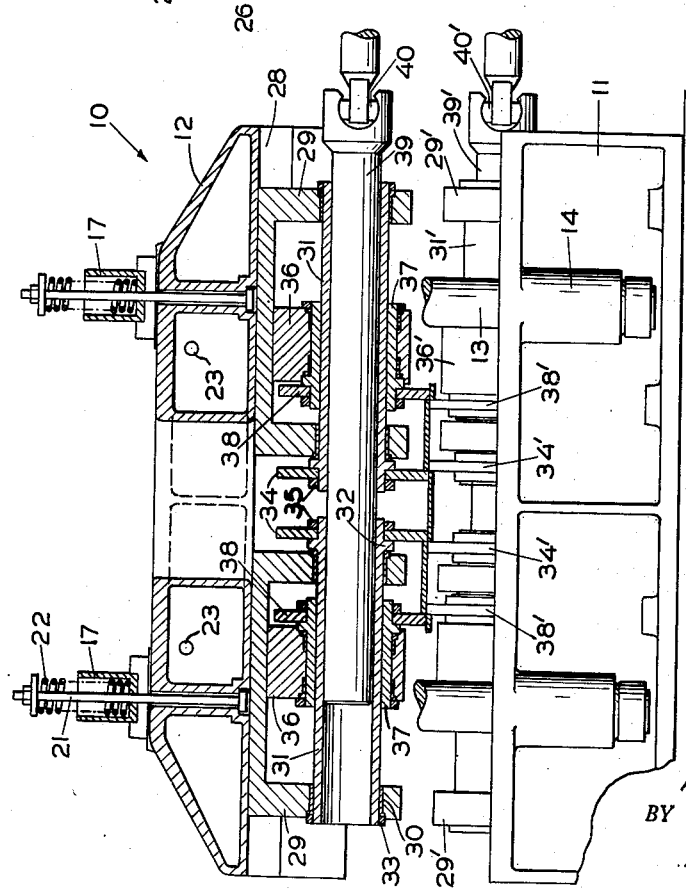
Fig. 6 is a front elevational view similar to that of Fig. 1 but on a reduced scale, and partly broken away and in section to illustrate the details of construction of the device embodying the invention.

Referring to the drawings in detail, and initially to Figs. 1, 2 and 6 thereof, a slitting shear embodying the invention is there shown and generally indicated by the reference numeral 10.

Slitting shear 10 includes a frame formed by a lower base 11 and an upper beam 12 which is supported on and vertically movable relative to the base 11.

The vertically movable mounting of upper beam 12 is preferably accomplished by pairs of columns 13 extending vertically from bosses 14 formed on the front and rear sides of base 11 adjacent the opposite ends of the latter. Each column 13 is formed with an upper section 15 having a threaded portion. The upper beam 12 is provided with hollow bosses 18, vertically aligned with the bosses 14 of the base, to loosely receive the threaded portions of the related columns 13, and each boss 18 is formed with an enlarged portion forming a casing or housing 19 for a nut member 20 which is rotatable therein (Fig. 2) and threadedly engages the threaded portion of the related column. Thus, the upper beam 12 is movable vertically by rotation of nut members 20 to displace the latter along the threaded portions of the columns.

In order to resiliently remove the weight of upper beam 12 from the nuts 20, cross-heads 17 are supported at their opposite ends to the upper ends 16 of the forward and rearward columns 13. Hanger rods 21 extend slidably through cross-heads 17 and are provided with suitable abutments at their upper ends. Compression springs 22 are interposed between such abutments and cross-heads 17 (Fig. 6) to continuously urge rods 21 upwardly, and the lower ends of the rods are headed to engage the upper beam and lift the latter. Thus, the springs 22 support the weight of upper beam 12 and take-up any play that may be present between nut members 20 and the threaded portions of columns 13 as well as facilitating the rotation of the nut members.

In order to rotate the four nut members 20 simultaneously for effecting uniform vertical displacement of upper beam 12, two worms 23, extending fore and aft, are journalled in the upper beam for meshing engagement adjacent their opposite ends with worm gears formed on the periphery of the forwardly and rearwardly located nut members, and both worms 23 have bevel gears 24 at one end meshing with bevel gears 25 on the opposite ends of a shaft extending lengthwise of, and journalled on, the beam 12 to be rotated either manually or by a suitable electric motor 26. Thus, the upper beam 12 is both vertically adjustable relative to the base 11 and resiliently mounted to provide advantages that will be apparent as this description proceeds.

As seen in Fig. 2, base 11 is formed with an open ended channel extending the length thereof and opening along its length toward the upper beam to provide a guide way 27 within which the supporting structure for the lower rotary shear blades may be mounted for horizontal movement laterally along the base. The upper beam 12 is similarly formed with an open ended channel extending the length thereof and opening along its length toward base 11 to provide a guideway 28 within which the supporting structure for the upper rotary shear blades may be mounted for horizontal movement laterally along the upper beam. The supporting structure for the upper and lower shear blades is the same but inverted, and reference will for convenience be made only to the supporting structure for the upper shear blades in describing the details of the preferred construction thereof, it being understood that the corresponding parts of the supporting structure for the lower shear blades are identified by primed numerals corresponding to the reference numerals affixed to the described structure.

The preferred supporting structure for the upper shear blades, seen in sectional view in Fig. 6, includes box-like main carriages 29 slidable in guideway 28 and open at the sides thereof facing out of such guideway. Two of such main carriages are provided in each guideway of the illustrated embodiment, however, any desired number thereof may be utilized depending upon the number of shear blades to be supported and within the limitations imposed by the size of the machine. The opposite end walls of each of the main carriages are extended out of the guideway and carry aligned bearings 30 in which the opposite end portions of a hollow shaft 31 are journalled for rotation of such shaft about a horizontal axis. The opposite end portions of shaft 31 are provided with means engaging the edges of the supporting bearings and preventing axial movement of the shaft relative to carriage 29, for example the radially extending flange 32 and the annular cap 33 appearing in the drawing. One end of shaft 31, in the illustrated embodiment the inner end thereof, projects through and beyond the adjacent end wall of carriage 29 to support a rotary shear blade 34 which is fixed to shaft 31, for rotation with the latter, by a suitable clamping ring 35. The interior of each main carriage 29 is shaped to provide a horizontal, laterally extending guideway for an auxiliary carriage 36. While only one auxiliary carriage is carried within each of the main carriages of the illustrated embodiment, several of such auxiliary carriages may be so carried to provide supports for additional shear blades. Each auxiliary carriage 36 is formed with a horizontal bore having a bearing therein to rotatably support an outer hollow shaft 37 of an inner diameter sufficient to permit the related shaft 31 to extend slidably therethrough. Outer hollow shaft 37 has a length substantially smaller than the distance between the end walls of main carriage 29 and is restrained against axial movement relative to its supporting auxiliary carriage by means similar to that employed for that purpose on the shaft 31, so that outer shaft 37 is movable horizontally in a lateral direction with its auxiliary carriage and independent of any such motion by the related main carriage or by the blade 34. One end of outer hollow shaft 37, in the illustrated case, the inwardly extending end, projects beyond its supporting auxiliary carriage to support a rotary shear blade 38 which is fixed thereto in a conventional manner.

In order to simultaneously rotate all of the rotary shear blades without obstructing or interfering with the horizontal adjustment thereof or with the vertical movement of the upper shear blades as a unit with the vertically movable upper beam 12, drive shafts 39 and 39' extend slidably into hollow shafts 31 and 31', respectively, and are connected to a driving motor at one side (not shown) through couplings including universal joints 40 and 40', while keys or splines 41 and 42 engaging between outer shafts 37 and shafts 31, and between shafts 31 and drive shafts 39, respectively (Fig. 2), insure the rotation of the blades 34 and 38 with the related drive shaft.

To provide for the horizontal movement of the upper main carriages 29, a lateral cavity 43 is formed in the upper beam and opens into guideway 28 of the latter, while each of the carriages 29 is formed with a gear rack 44 extending along such cavity. Shafts 45 extend at right angles to guideway 28 and are journalled in the upper beam above each of the main carriages to rotatably support a pinion 46 meshing with the related gear rack 44. The shafts 45 may be rotated manually, however, in the preferred embodiment, reversible electric motors 47 are carried at the opposite ends of the upper beam (Fig. 1) and each is operatively connected by suitable gearing to the adjacent one of the shafts 45. Thus, the motors 47 may be utilized to move each of the carriages 29 horizontally and with them the related shear blades 34 and 38.

The lower main carriages 29' are similarly moved along guideway 27 by pinions 46' meshing with gear racks 44' on the undersides of such carriages (Fig. 2). However, the shafts on which such pinions are mounted are preferably individually rotated by electric motors 48 mounted at the rear of the base 11 (Fig. 2) rather than at the ends of the latter. Neither the motors 47 nor the motors 48 are shown in Fig. 6 in the interests of clarity.

The slitting shear 10 also includes mechanism for horizontally and independently displacing each of the auxiliary carriages 36 and 36' relative to the main carriage by which it is carried. Such mechanism includes a pair of screw spindles 49 and 50 (Fig. 2) rotatably extending through the outer end wall of each main carriage and threadedly engaging in suitable tapped bores formed in the related auxiliary carriage. These are not shown in Fig. 6 in the interests of clarity. The screw spindles are simultaneously rotated in the same direction by a conventional gear train mounted within a gear housing 51 carried at the outside of the outer end wall of each main carriage, and such gear train is preferably driven by a suitable reversible electric motor 52 mounted on the gear housing. Thus, when motor 52 is energized to rotate the screw spindles 49 and 50, the related auxiliary carriage and its shear blade 38 are horizontally displaced relative to the shear blade 34 supported by the main carriage in which such auxiliary carriage is movable.

Since a slitting shear, having the structural features related above, makes it possible to mount the several shear blades on the supporting shafts so that the free or unsupported lengths of the latter are negligible, such shafts are subject to only minor bending stresses even when metal plates of substantial thickness are being sheared into longitudinal strips, and therefore excessive deflections of the shafts are avoided. It is further apparent that the unsupported lengths of the shafts carrying the several shear blades are not increased as a result of changes in the relative positions of the blades, and that the auxiliary carriages tend to support and stabilize the relatively long hollow shafts rotatably mounted in the main carriages.

The slitting shear embodying the present invention has the further advantage of permitting the stepless independent horizontal displacement of each of the several rotary shear blades so that the machine may be conveniently and quickly adapted to slit a metal sheet or plate into strips of any desired width, as illustrated in Figs. 3 and 4 of the drawing, or merely to trim the edge portions of the metal plate as illustrated in Fig. 5.

Furthermore, the resilient mounting for the upper beam 12 insures the accurate vertical positioning of the rotary shear blades by removing the play between the threaded portions of the columns and nut members 20 as well as relieving the load from the latter to facilitate their rotation, while the provision for vertical movement of such upper beam permits the axis of rotation of the upper rotary shear blades to be lowered towards that of the lower blades to compensate for the reduction of the diameters of the blades as a result of normal wear so that the proper shearing relationship may be maintained between the edges of the cooperating blades and so that such blades may be efficiently used for a longer operating period before the replacement thereof is required.

Finally, the provision for vertical movement of the upper beam in cooperation with the features providing independent horizontal displacement of each of the blades makes it possible to raise the upper shear blades until their edges are clear of the edges of the related lower shear blades and to then horizontally displace the cooperating blades so that their relative positions are reversed thus permitting the use of the cutting edges at either side of the blades for shearing metal plates or sheets. Thus, while in Fig. 1 the upper blades 34 are shown positioned at the inner sides of the cooperating lower blades 34', by reason of the features noted above the relative positions of these blades may be reversed to position the upper blades at the outer sides of the lower blades, thereby prolonging the useful life of the blades, as well as facilitating the setting up of the proper shearing relationship under the varying conditions that may be encountered.

While a preferred embodiment of the invention has been illustrated and described in detail, it will be apparent that the new features of construction and combination herein set forth may be embodied in other forms of slitting shears, and it is therefore desired that the invention be accorded a scope fully commensurate with its contributions to the art, which are intended to be defined by the appended claims.

What is claimed is:

1. A slitting shear comprising a frame defining a laterally extending opening having horizontal upper and lower edges; upper and lower guideways formed along said upper and lower edges, respectively; upper shear blade assemblies each including a main carriage slidable on said upper guideway for independent horizontal movement therealong; at least one auxiliary carriage slidably mounted on said main carriage for laterally horizontal movement independent of the latter and between the ends of the latter, said auxiliary carriage being slidable with its main carriage and a shear blade rotatably supported on said main carriage and on each auxiliary carriage and movable horizontally with the related carriage; and lower shear blade assemblies each including a main carriage slidable on said lower guideway, for independent horizontal movement therealong, at least one auxiliary carriage slidably mounted on the last mentioned main carriage for laterally horizontal movement independent of the latter, said auxiliary carriage being slidable with its main carriage, and a shear blade rotatably supported on said last mentioned main carriage and on each last mentioned auxiliary carriage and movable horizontally with the related carriage to operatively cooperate with the first mentioned shear blades for shearing a plate passed through said opening.

2. A slitting shear comprising a frame defining a laterally extending opening having horizontal upper and lower edges; upper and lower guideways formed along said upper and lower edges, respectively; and paired upper and lower shear blade assemblies carried by said frame and extending into said opening; each of said assemblies including a main carriage slidable on the related one of said guideways for independent horizontal movement therealong, at least one auxiliary carriage slidably mounted on said main carriage for laterally horizontal movement independent of the latter, a horizontal laterally extending shaft journalled on said main carriage, a hollow outer shaft journalled on each auxiliary carriage and sliding on the first mentioned shaft, and a shear blade fixed on said first mentioned shaft and a shear blade fixed on each hollow outer shaft to operatively cooperate with the related shear blades of the assembly paired therewith for shearing a plate passed through said opening.

3. A slitting shear comprising a frame defining a laterally extending opening having horizontal upper and lower edges; upper and lower guideways formed along said upper and lower edges, respectively; paired upper and lower shear blade assemblies carried by said frame and extending into said opening; each of said assemblies including a main carriage slidable on the related one of said guideways for independent horizontal movement therealong, at least one auxiliary carriage slidably mounted on said main carriage for laterally horizontal movement independent of the latter, a horizontal laterally extending shaft rotatably mounted on said main carirage and held against axial movement relative to the latter, a hollow outer shaft rotatably mounted on each auxiliary carriage and sliding on the first mentioned shaft, said outer shaft being held against axial movement relative to its supporting carriage, means holding said hollow outer shaft and said first mentioned shaft against rotational movement relative to each other, and a shear blade fixed on said first mentioned shaft and a shear blade fixed on each hollow outer shaft to operatively cooperate with the related shear blades of the assembly paired therewith for shearing a plate passed through said opening; and driving means engaging said first mentioned shafts of said upper and lower assemblies for rotating said shear blades.

4. A slitting shear comprising a frame defining a laterally extending opening having horizontal upper and lower edges; upper and lower guideways formed along said upper and lower edges, respectively; paired upper and lower shear blade assemblies carried by said frame and extending into said opening; each of said assemblies including a main carriage slidable on the related one of said guideways for independent horizontal movement therealong, at least one auxiliary carriage slidably mounted on said main carriage for laterally horizontal movement independent of the latter, a horizontal laterally extending hollow shaft journalled on said main carriage for axial movement with the latter, a hollow outer shaft journalled on each auxiliary carriage for axial movement with the latter and sliding on the first mentioned hollow shaft, means holding said first mentioned shaft and said outer shaft against rotational movement relative to each other, and a shear blade fixed on said first mentioned shaft and a shear blade fixed on each outer shaft to operatively cooperate with the related shear blades of the assembly paired therewith for shearing a plate passed through said opening; an upper and a lower driving shaft extending slidably in said first mentioned hollow shafts of said upper and lower shear blade assemblies, respectively; means holding said driving shafts and said first mentioned hollow shafts against rotational movement relative to each other; and means rotating said driving shafts.

5. A slitting shear comprising a frame with a fixed base and an upper beam defining a laterally extending opening having horizontal upper and lower edges; upper and lower guideways formed along said upper and lower edges, respectively; vertical columns extending from said base; resilient means suspending said upper beam from said columns; means connected with said columns for laterally stabilizing said upper beam; paired upper and lower shear blade assemblies carried by said frame and extending into said opening; each of said assemblies including a main carriage slidably supported on the related one of said guideways for independent horizontal movement therealong, at least one auxiliary carriage slidably mounted on said main carriage for laterally horizontal movement independent of the latter but movable therewith, and a shear blade rotatably supported on said main carriage and a shear blade rotatably supported on each auxiliary carriage to operatively cooperate with the related shear blades of the assembly paired therewith for shearing a plate passed through said opening; independent means carried by said frame and engaging said main carriage for each of said upper and lower assemblies to move the related main carriage horizontally along its supporting guideway; and means on each main carriage engaging the related auxiliary carriage to move the latter horizontally in a lateral direction relative to said main carriage so that each of said shear blades is independently axially movable to permit shearing of a plate into strips of any desired widths.

6. A slitting shear comprising a frame defining a laterally extending opening having horizontal upper and lower edges; upper and lower guideways formed along said upper and lower edges, respectively; paired upper and lower shear blade assemblies carried by said frame and extending into said opening; each of said assemblies including a main carriage slidably supported on the related one of said guideways for independent horizontal movement therealong, at least one auxiliary carriage slidably supported on said main carriage for laterally horizontal movement independent of the latter and between the ends of the latter, said auxiliary carriage being slidable with its main carriage, and a shear blade rotatably supported on said main carriage for axial horizontal movement with the latter and a shear blade rotatably supported on each auxiliary carriage for axial horizontal movement with the latter and to operatively cooperate with the related shear blades of the assembly paired therewith in shearing a plate passed through said opening; means rotating said shear blades; individual means for independently moving each main carriage horizontally along its supporting guideway; and individual means for independently moving each auxiliary carriage horizontally in a lateral direction on its supporting main carriage.

7. A slitting shear comprising a frame defining a laterally extending opening having horizontal upper and lower edges; upper and lower guideways formed along said upper and lower edges, respectively; paired upper and lower shear blade assemblies carried by said frame and extending into said opening; each of said assemblies including a main carriage slidably supported on the related one of said guideway for independent horizontal movement therealong, at least one auxiliary carriage slidably supported on said main carriage for laterally horizontal movement independent of the latter and between the ends of the latter, said auxiliary carriage being slidable with its main carriage, and a shear blade rotatably supported on said main carriage for axial horizontal movement with the latter and a shear blade rotatably supported on each auxiliary carriage for axial horizontal movement with the latter and to operatively cooperate with the related shear blades of the assembly paired therewith in shearing a plate passed through said opening; a laterally extending gear rack on each main carriage; a rotatable pinion carried by said frame for each assembly and meshing with said gear rack thereof; independent means for rotating each of said pinions; laterally extending horizontal screw spindles rotatably carried by each main carriage for each auxiliary carriage supported thereon and threadedly engaging the related auxiliary carriage; and independent means for rotating said screw spindles on each main carriage so that said shear blades are independently movable in a lateral and horizontal direction and in a stepless manner to permit shearing of a plate into strips of any desired widths.

8. A slitting shear comprising a frame defining a laterally extending opening having horizontal upper and lower edges; upper and lower guideways formed along said upper and lower edges, respectively, a plurality of paired upper and lower shear-blade assemblies carried by said frame and extending into said opening; said upper blade assemblies and said lower blade assemblies being respectively slidable along relatively fixed, upper and lower parallel shafts extending laterally between the ends of the frame; means for rotating said shafts; each of said assemblies including a main carriage slidable on the related one of said guideways for independent horizontal movement therealong, at least one auxiliary carriage slidably mounted on said main carriage for laterally horizontal movement independent of the latter; and a shear blade rotatably supported on each main carriage and on each auxiliary carriage and movable horizontally with the related carriage to cooperate operatively with the rotated shear blades of the assembly paired therewith for shearing a plate passed through said opening; said shaft being drivingly connected with each shear blade for rotating the same.

References Cited in the file of this patent

UNITED STATES PATENTS

| Number | Name | Date |
|---|---|---|
| 325,812 | Bridgman | Sept. 8, 1885 |
| 476,075 | Rohan | May 31, 1892 |
| 1,687,466 | Stevens | Oct. 9, 1928 |
| 2,020,491 | Winters | Nov. 12, 1935 |
| 2,222,051 | Tyrrell | Nov. 19, 1940 |
| 2,391,721 | Lundeen | Dec. 25, 1945 |
| 2,548,459 | Wood | Apr. 10, 1951 |

FOREIGN PATENTS

| Number | Country | Date |
|---|---|---|
| 593,587 | Germany | Feb. 28, 1934 |